A. H. DARKER.
DYNAMO ELECTRIC MACHINE AND METHOD OF AND APPARATUS FOR CONTROLLING THE OUTPUT THEREOF.
APPLICATION FILED JAN. 20, 1916.

1,313,272.

Patented Aug. 19, 1919.
2 SHEETS—SHEET 1.

Inventor:
Alfred H Darker
by
Synnestvedt Bradley Lehmann & Forbes
Attys

A. H. DARKER.
DYNAMO ELECTRIC MACHINE AND METHOD OF AND APPARATUS FOR CONTROLLING THE OUTPUT THEREOF.
APPLICATION FILED JAN. 20, 1916.
1,313,272.
Patented Aug. 19, 1919.
2 SHEETS—SHEET 2.
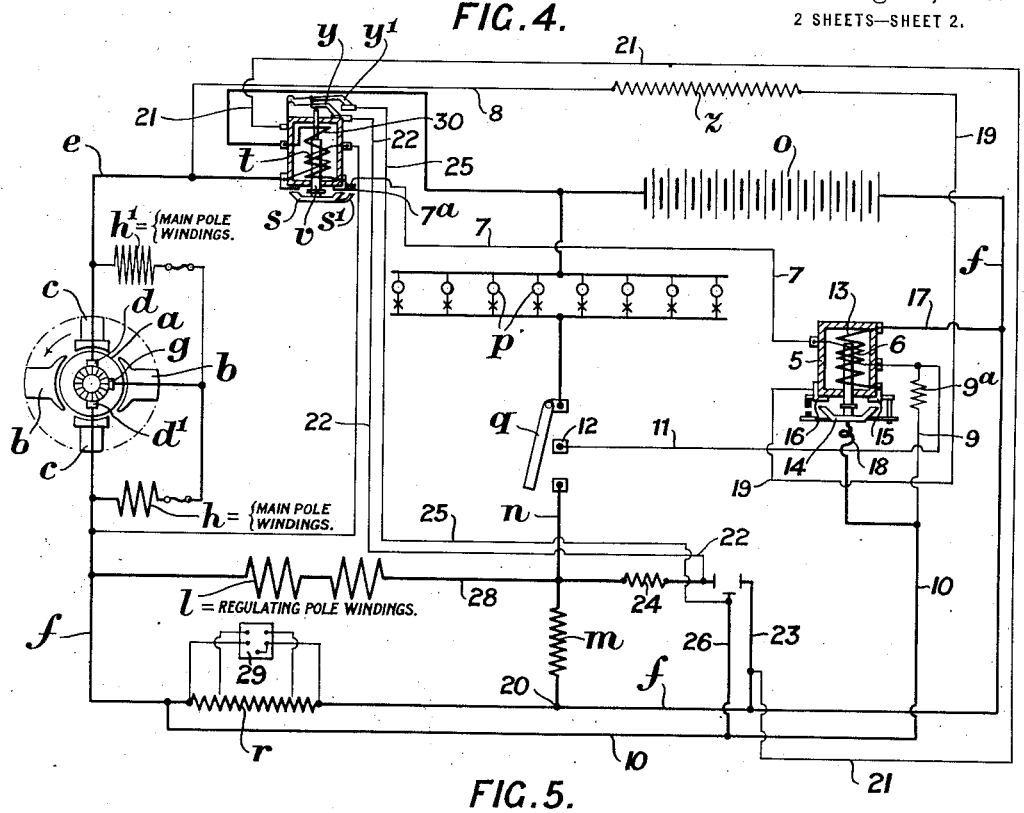
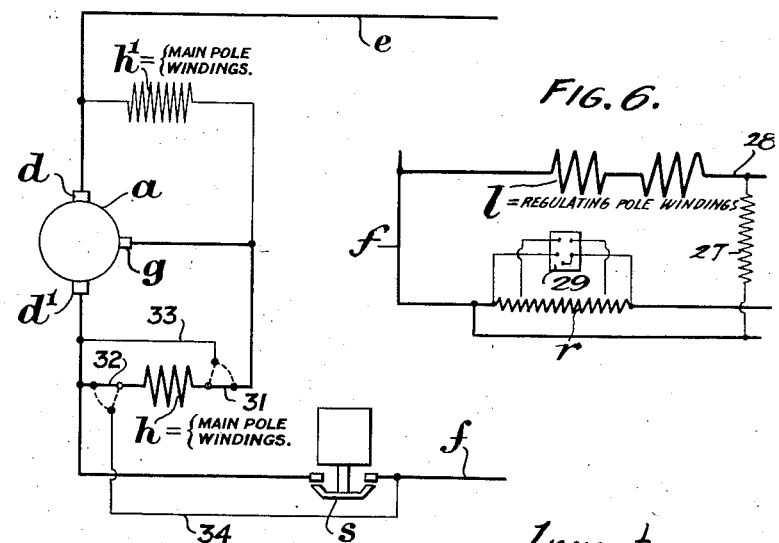

UNITED STATES PATENT OFFICE.

ALFRED HENRY DARKER, OF BLACKHEATH, ENGLAND, ASSIGNOR TO J. STONE & COMPANY, LIMITED, OF DEPTFORD, ENGLAND.

DYNAMO-ELECTRIC MACHINE AND METHOD OF AND APPARATUS FOR CONTROLLING THE OUTPUT THEREOF.

1,313,272.     Specification of Letters Patent.     Patented Aug. 19, 1919.

Application filed January 20, 1916. Serial No. 73,091.

*To all whom it may concern:*

Be it known that I, ALFRED HENRY DARKER, a subject of the King of Great Britain, and residing at "Heath View", Montpelier Row, Blackheath, in the county of Kent, England, have invented new and useful Improvements in Dynamo-Electric Machines and Methods of and Apparatus for Controlling the Output Thereof, of which the following is a specification.

This invention relates to improvements in dynamo electric machines and methods of and apparatus for controlling the output thereof and it is particularly applicable to electric train lighting, heating and ventilating systems such as are used on Pullman and other railway cars and upon motor vehicles, upon which latter the dynamos are generally driven by internal combustion engines. The invention is also applicable in other cases in which dynamos are driven by variable speed motors, such as water motors.

One object of the invention is to provide a simple dynamo, of the self-regulating type in which an auxiliary brush is employed with field windings connected between a main brush and the auxiliary brush, which is adapted to build up its field quickly at low speeds, so that it will cut-in at a relatively low speed, and at the higher speeds will maintain the desired output and voltage. A further object is to enable the avoidance of any considerable fall or fluctuation in the required output at the higher speeds, while at the same time permitting of designing or adjusting the field windings so that at higher speeds the dynamo will give a constant output or an output slightly increasing with increase in speed, or slightly decreasing with increase in speed, as may be demanded.

A further object is to provide an improved method of and a novel combination for automatically regulating the output in accordance with the varying demand made by external circuits in which battery charging and current consumption are proceeding.

These and other objects will appear from the following description of the preferred embodiments of my invention which are illustrated in the accompanying drawings, in which:—

Fig. 4 is a diagram of another combination, and

Fig. 5 is a diagram showing motoring connections.

Fig. 6 is a diagram of a modification of the arrangement shown in Fig. 4.

Figure 1:
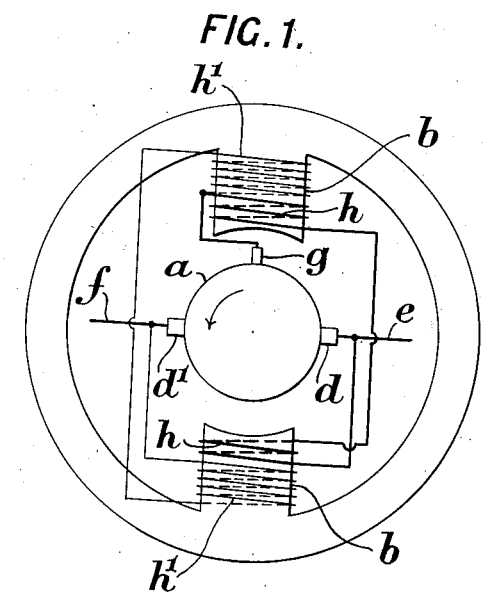
Figure 1 is a diagram of a simple two-pole dynamo according to these improvements.

Referring to Fig. 1, $a$ is the armature, $b$ are the field magnets, $d$ is the positive brush, $d'$ is the negative brush, $e$ is the positive main conductor, $f$ is the negative main conductor, and $g$ is the auxiliary brush. The field winding $h$ is connected between the main brush $d$ and the auxiliary brush $g$ and the winding $h'$, which is wound in the same direction as the winding $h$ is connected between the auxiliary brush $g$ and the negative brush $d'$.

It will be readily understood that the winding $h$ may be connected between the negative brush $d'$ and the auxiliary brush $g$ and the winding $h'$ may be connected between the positive brush $d$ and the auxiliary brush $g$, provided that the latter is shifted through 180°, so that it is in advance of the negative brush to which the winding $h$ is, in this case, connected.

The winding $h$ differs from the winding $h'$, being of fewer turns and lower resistance, or being in a circuit of lower resistance than the winding $h'$. These windings $h$ $h'$ are so relatively proportioned that, in spite of speed variation, the output or voltage is automatically kept constant, or regulated as desired, for all speeds over the range between the maximum and minimum limits of which useful or working current is produced.

As a practical example, in a dynamo having an output of, say, thirty to thirty-five amperes, at twenty-eight to thirty-two volts, the winding $h$ may consist of about one hundred and forty turns, the wire being for example of No. 15 Standard wire gage, and the winding $h'$ may consist of about five hundred and fifty turns, the wire being, for example of No. 19 Standard wire gage.

When the dynamo commences to revolve in the direction of the arrow, and until a moderate speed has been reached, the current flows in the two windings $h$ $h'$ in the same direction with increasing strength and builds up the field. Such building up is very rapid owing to the fact that the winding $h'$, being of comparatively low resistance, carries a relatively strong current even at low speeds. An early cut in of the dynamo is therefore possible. After the dynamo has been cut in, increased armature reaction, due to increased armature current and further increases in speed, produces an advance of the neutral axis in the well-known manner, thereby reducing the potential difference between the brushes $d$ and $g$ and increasing the potential difference between the brushes $g$ and $d'$. The result is that the current in the winding $h$ dies away as the speed still further increases, until at high speeds the excitation due to the winding $h$ may diminish to zero. The proper excitation of the machine, however, is maintained by the excitation due to the winding $h'$, which increases in such a manner that constancy of the output or voltage is maintained in spite of the rapidly diminishing excitation by the winding $h$. In some dynamos it may be arranged that at the very highest speeds, an appreciable reverse current flows in the winding $h$ and demagnetizes, but in some cases it is found that for ordinary ranges of speed, constancy in output is secured by the current dying away in the winding $h$ and growing in the winding $h'$ as described. The reason for the reversal of the current in the winding $h$ in the circumstances indicated are known and need not be particularly explained in this specification. The relative proportioning and characters of the windings $h$ $h'$ enable predetermined effects to be obtained, and the above described character of the winding $h$ is important for achieving the improved generating and self-regulating properties of the dynamo.

In the winding $h$ between low and very high speeds the current may vary between a maximum of four amperes in one direction and two amperes in the reverse direction while, in the winding $h'$, over the same range of speed, the current may grow from say one half an ampere to one and a half or more.

The particulars which have been given as to windings, current strengths and voltages are only given by way of example as the different values will vary according to circumstances, but they will serve for illustrating the manner in which the two windings are proportioned and adapted for securing the desired result.

The brushes $d$ $d'$ are usually arranged about in the position seen in Fig. 1, and the auxiliary brush $g$ is preferably arranged in the position shown. In fact it is convenient and advantageous to fix the brush $g$ in the position shown, while the brushes $d$ $d'$ may be arranged upon a rocker. When the dynamo is required to reverse, as is generally the case with dynamos driven from railway carriage axles, the connections are reversed by a suitable reversing switch. For example the brushes $d$ $d'$, or all three brushes, may be arranged on a rocking reversing switch which rocks to one position or the other and makes appropriate connections according to the direction of motion, in the well-known manner. The reversing switch described in my prior U. S. A. patent specification No. 1,131,914 is advantageously used for this purpose as it enables reversal to be effected with only a slight rocking of the brushes $d$ $d'$. Therefore, with such an arrangement, the brushes $d$, $d'$ $g$, occupy approximately the positions shown in Fig. 1, during motion in either direction.

Figure 2:
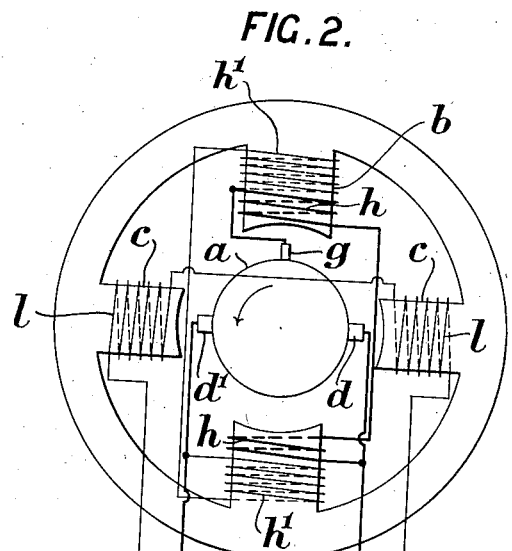
Fig. 2 is a diagram of a modification applied to a simple two pole dynamo with intermediate regulating poles.

In the arrangement seen in Fig. 2, the dynamo is fitted with intermediate regulating poles $c$ having windings $l$ connected across a resistance $m$ in the lamp circuit $n$. This arrangement of regulating pole windings and its effect are fully described in my U. S. A. patent specification, Serial No. 14,383, so that it is now sufficient to explain that, upon an increase in the lamp load, a stronger current flows in the windings $l$, the increased excitation of the poles $c$ by the windings $l$ bringing about a greater opposition to, or correction of, the distortion of the main field, thereby raising the output in accordance with the increased demand in the lamp or consuming circuit. The self-regulation for each load for all speeds is, however, performed by the windings $h$ $h'$ as hereinbefore described.

The lamps $p$ are controlled by a main lighting switch $q$ and each lamp, or each group of lamps, may have its own respective switch as shown.

Figure 3:
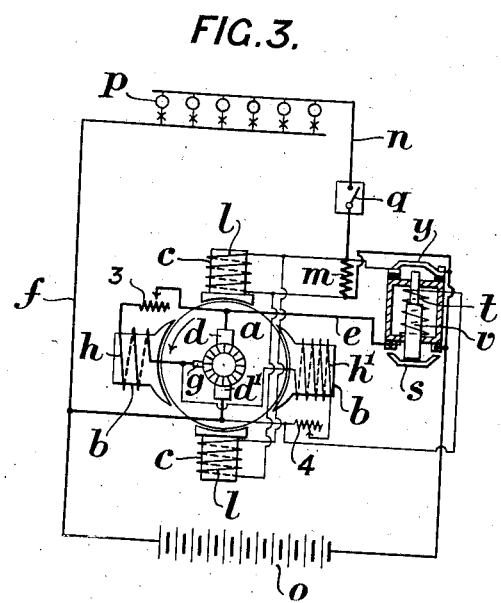
Fig. 3 is a diagram of a novel combination involving the arrangement illustrated in Fig. 2.
Figure 3:
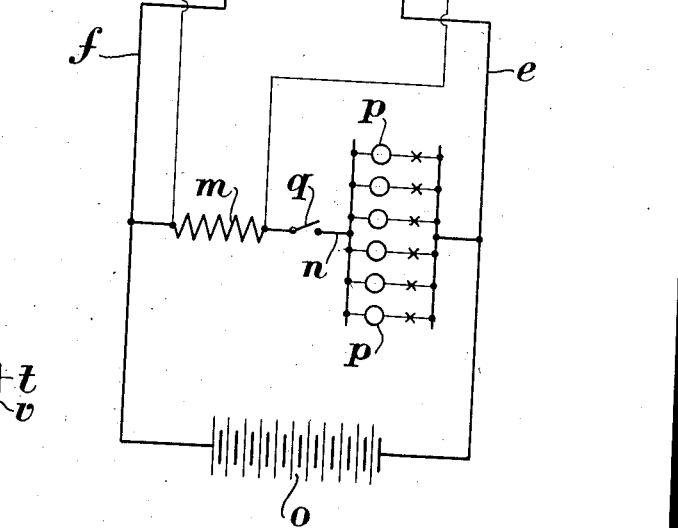

In Fig. 3 the main circuit is closed at the correct speed or voltage by the switch brush $s$ which is closed on to its contacts by the action of the voltage winding $t$ on the solenoid core $v$, to which latter the brush $s$ is attached. When the winding $t$ is insufficiently energized for holding up the core $v$, the latter drops and the switch $s$ opens the main circuit. At the same time a rod on the core $v$ permits a switch $y$ to close and short-circuit the resistance $m$, the battery $o$ then supplying the lamps direct if the switch $q$ is closed.

Adjustable resistances 3 and 4 may be inserted in the circuits of the field windings $h$ $h'$ respectively so that the magnetizing values of these windings may be readily changed to suit particular requirements.

In the installation illustrated by the diagram in Fig. 4, parts which are similar to those seen in Fig. 3 are indicated by similar reference characters. In Fig. 4 winding $h$ is connected between the negative brush $d'$ and the auxiliary brush $g$ in advance of the brush $d'$. The battery $o$ is protected against overcharge by an electro-magnetic or solenoid switch 5 which, when the battery voltage reaches a pre-determined figure or maximum, operates to connect a resistance $z$ in shunt with the battery $o$, as hereinafter described.

The over-charge magnet 5 comprises a voltage or shunt winding 6 which is connected by the wire 7 with an extra contact $7^a$ on the cut-in switch, the brush $s$ of the latter having an extension $s'$ which touches the contact $7^a$ only after the brush $s$ has been strongly pulled against the main contacts of the switch, so that the circuit of the overcharge solenoid is completed only after the closing of the cut-in switch $s$. The other end of the winding 6 is connected by wire 9, including a resistance $9^a$, with a wire 10 which is connected between the over-charge switch brush and the negative main $f$, and it is also connected by the wire 11 with an additional contact 12 on the lighting switch $q$. When the latter is open, therefore, the winding 6 is connected across the mains $e$ and $f$ in series with the resistance $9^a$, but when the switch $q$ is closed the resistance $9^a$ is virtually short circuited as the current will then pass from the winding 6, through the wire 11 to the contact 12, and into the switch lever, where it joins the lamp current passing through the conductor $n$ and windings $l$ to the negative main $f$. Thus the overcharge switch 5 requires a greater voltage to cause it to operate when the lamps are switched off as compared with when they are switched on. The over-charge switch 5 also comprises a series winding 13 which is connected up when the switch brush 14 is lifted by the solenoid core up to its contacts 15, 16. For this purpose the winding 13 is connected by a wire 17 with the negative main $f$ and at its opposite end is connected to the switch contact 15. The brush 14 is connected by a flexible connection 18 with the wire 10. The wire 19 coming from the resistance $z$, is connected to the contact 16. When, therefore, the solenoid winding 6 sucks up the core and the brush 14 touches the contacts 15 and 16, the series winding 13 will be connected up in series with the battery $o$ and will assist the shunt winding 6 to hold up the core and the resistance $z$ will be connected in shunt with the battery $o$, thereby reducing the charging current passed into the battery. By the employment of the resistance $z$ the output of the dynamo need not be so drastically curtailed as would otherwise be necessary and the result is that a much closer regulation is possible.

In the negative main $f$ between the negative terminals of the resistance $m$ and the windings $l$ there is a variable resistance $r$. The function of this resistance is to assist in governing the output of the dynamo so that any desired charging current may be had, particularly when the lamps are not in use and the battery is being charged. It will be seen that when the lamps are off the charging current passing along the negative main divides at the junction 20, part flowing through the resistance $m$ and windings $l$ to the negative brush and part flowing through the resistance $r$. Now if the value of the resistance $r$ be low as compared with the resistance $m$ plus the resistance of the windings $l$, the latter will receive little current and the output of the dynamo will be low and the charging current will be weak. If it be desired to charge the battery with a stronger current, as, for example, is necessary when the specific gravity of the acid in the battery is low, the resistance $r$ is adjusted to a higher value, whereupon the windings $l$ receive more current and the output of the dynamo is increased.

In Fig. 3 the switch $y$ when it closed simply short-circuited the resistance $m$, but in Fig. 4 the switch brush $y$ is connected by a wire 21 with a conductor 23 branching from the negative main $f$ and the contact for the brush $y$ is connected by a wire 22 with one terminal of a resistance 24 of low value whose other terminal is connected with the positive terminal of the resistance $m$. Therefore when the switch $y$ is closed instead of the resistance $m$ being short-circuited, as in Fig. 3, it has connected in parallel with it the resistance 24.

Above the switch $y$ there is a switch $y'$ which is opened by the core $v$ after the latter has opened the switch $y$. The switch $y'$ also is connected through the wire 21 with the conductor 23 and the contact of the switch $y'$ is connected through wire 25 with a branch conductor 26 from the conductor 10 which joins the negative main $f$ at a point between the negative terminals of the resistance $r$ and windings $l$. The closing of the switch $y'$ therefore, in effect, short-circuits the resistance $r$.

Now the following advantage arises from this arrangement, namely, that when the dynamo is stationary, or is running but has not cut in, and the lamps are being supplied by the battery, a part of the current coming from the lamps will pass through the regulating pole windings $l$ owing to the presence of the resistance 24, whereas if the resistance $m$ were merely short-circuited practically all the current would pass through the short circuit and practically none through the windings $l$. This portion of the lamp current passing through the windings $l$ flows through part of the negative main then through the wires 10, 26, 25 and switch $y'$ through wires 21 and 23 back to the negative main. In this way a desirable current strength is found in the regulating pole windings $l$ before the dynamo starts, so that when it does start it quickly develops the required output, owing to the additional excitation due to the poles $c$, and is cut in at a relatively low speed. This means that the dynamo relieves the battery of the lamp load at the earliest possible moment, which is desirable. The resistance 24 need be only a fraction of an ohm.

As soon as the switch $s$ cuts in the dynamo, the switch $y$ is lifted and opens the circuit of the resistance 24 so that current from the lamps then flows through the windings $l$ and resistance $m$ in parallel. The solenoid $t$ then becomes stronger and the core $v$ rises a little more, thereby opening the switch $y'$ and breaking the short circuit of the resistance $r$ through which will then flow the current returning from the battery to the dynamo and that portion of the current, coming from the lamps which passes through the resistance $m$.

In order to prevent an undue increase in the battery charging current when a big lamp load is turned on as compared with the strength of such charging current when only a very light lamp load is turned on, a resistance 27 (shown in Fig. 6) may be connected at one end to the wire 10 and at the opposite end to a point in the conductor 28 between the resistance $m$ and the windings $l$, it being understood that the system in other respects is the same as that shown in Fig. 4. In this way the resistances $m$, $r$ and 27 are connected in triangular fashion. This is found to very effectively prevent the windings $l$ from being too strongly energized when heavy lamp loads are turned on. However the resistance 27 may be dispensed with in many cases.

The adjusting device diagrammatically indicated at 29 in connection with the resistance $r$ is what is known as a four point adjusting switch which is capable of giving various combinations with portions of the resistance $r$.

It will be noted that in Fig. 4 a series winding 30 has been placed on the solenoid $t$ to assist in holding up the core, the circuit of this winding being, of course, completed by the switch brush $s$. When series windings are used on these solenoids they serve the useful function of demagnetizing and insuring the opening of the switch whenever the dynamo output falls to such an extent, owing to reduction of speed, that the battery is able to send a reverse current.

Dynamos having the windings and brushes connected and arranged according to these improvements run with practically sparkless commutation at all speeds and loads.

Regulating poles are not necessary for the efficient working of the improved dynamo which may also be advantageously run as a motor.

It will be observed that when the lamps are burning and the dynamo is cut in, the overcharge switch 5 permits the dynamo to deliver a charging current to the battery of sufficient strength for raising the terminal voltage of the battery to the desired extent. When the said voltage is reached the overcharge switch 5 in closing and connecting up the wire 10, not only introduces the shunt resistance $z$, but also by means of the wire 10 virtually short circuits the resistance $r$ so that less current will then flow through the windings $l$ of the regulating poles and the output will be decreased.

In some arrangements the shunt $z$ is not used and the overcharge switch operates only to short circuit the resistance $r$.

It is sometimes desirable to run the dynamo as a motor with current supplied from the battery. For example in installations in which the dynamo is driven by an internal combustion engine, the latter may be started by the dynamo running as a motor. Referring to Fig. 5 it will be seen that switches 31, 32 are provided in the circuit of the winding $h$. These switches may be moved to the dotted position in which the winding $h$, instead of being connected across the brushes $d'$ and $g$ is connected between the conductor 33 which branches from the main $f$ near to the brush $d'$, and the conductor 34 which is connected to the main $f$ beyond the switch $s$. Consequently if the switches 31 and 32 are moved to the dotted position when the switch $s$ is open, the winding $h$ will be connected in series with the armature between the mains $e$ and $f$ and the dynamo will run as a motor supplied with current from the battery. As the switches 31, 32 must not be moved to the dotted position when the switch $s$ is closed, it may be convenient to operate them automatically by any well known method.

What I claim as my invention and desire to secure by Letters Patent of the United States is:—

1. Apparatus of the character described, comprising in combination a dynamo having main poles, regulating poles and an auxiliary brush, main field windings of different characters connected between respective main brushes and the auxiliary brush, regulating pole windings connected across a resistance in the lamp circuit said regulating pole windings being wound to oppose distortion due to armature reaction, a battery charge resistance connected between corresponding terminals of said lamp resistance and said regulating pole windings, and a battery over-charge switch operative to reduce said battery charge resistance substantially as set forth.

2. Apparatus of the character described comprising in combination a dynamo having main poles regulating poles and an auxiliary brush, main field windings of different characters connected between respective main brushes and the auxiliary brush, regulating pole windings connected across a resistance in the lamp circuit said regulating pole windings being wound to oppose distortion due to armature reaction, a battery charge resistance connected between corresponding terminals of said lamp resistance and said regulating pole windings, hand-operated adjusting means adapted to vary said battery charge resistance, and a battery over-charge switch operative to reduce said battery charge resistance substantially as set forth.

ALFRED HENRY DARKER.